UNITED STATES PATENT OFFICE.

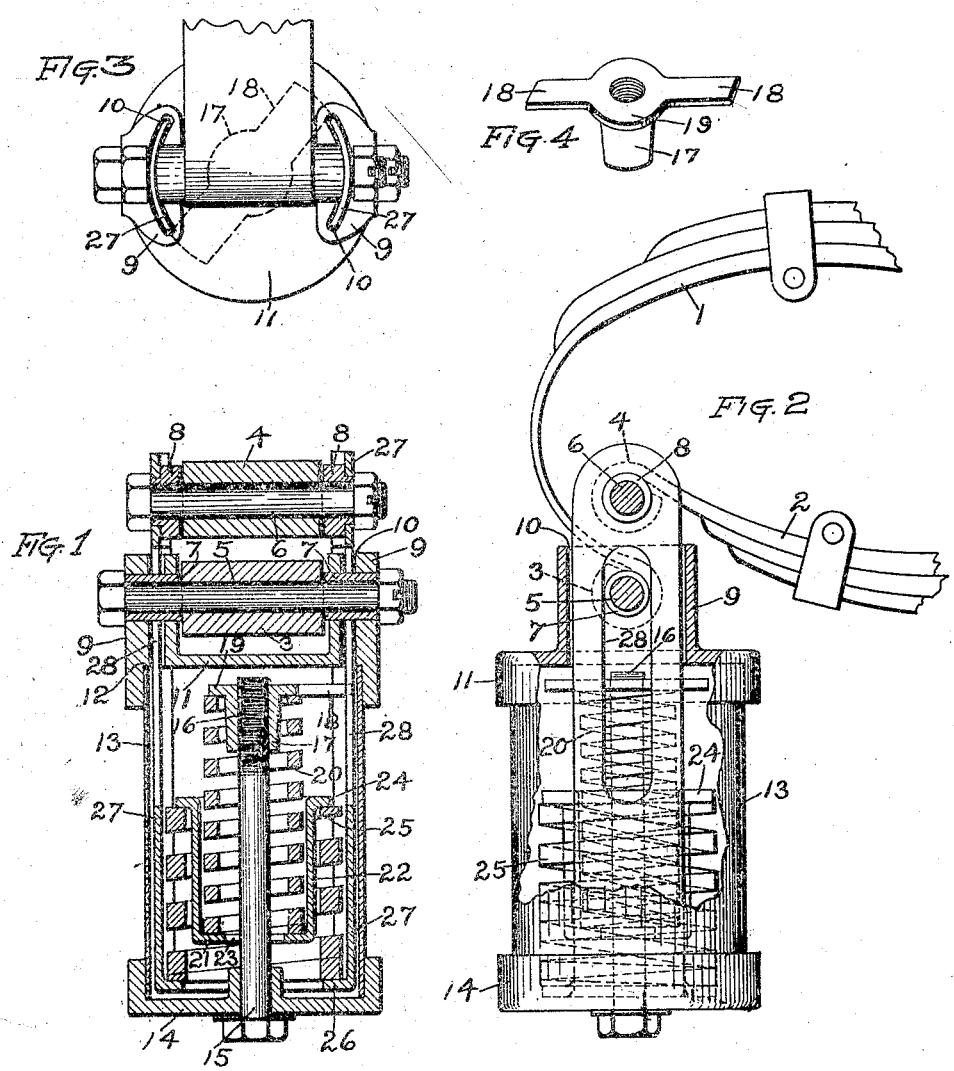

ALBERT S. KUX AND EUGENE H. BEACHAM, OF CHICAGO, ILLINOIS, ASSIGNORS TO JOHNSON SPECIALTY COMPANY, A CORPORATION OF ILLINOIS.

VEHICLE SUSPENSION-SPRING.

1,180,508.     Specification of Letters Patent.     Patented Apr. 25, 1916.

Application filed October 16, 1915. Serial No. 56,331.

*To all whom it may concern:*

Be it known that we, ALBERT S. KUX and EUGENE H. BEACHAM, citizens of the United States, residing at Chicago, in the county of Cook and State of Illinois, have invented a new and useful Vehicle Suspension-Spring, of which the following is a specification.

Our invention relates to improvements in suspension springs of the kind herein described and is useful to take up the shock between reciprocating parts, as that between the body and running gear of vehicles.

The objects of our invention are to construct a multiple cushion spring of strong and durable design, simplicity of parts, applicable to standard construction and cheap to manufacture.

We attain these objects by means of the peculiar combination of the several parts as clearly shown in the accompanying drawing, in which—

Figure 1 is a vertical section, showing the several working parts. Fig. 2 shows the application of our device to a standard vehicle spring. Fig. 3 is a plan view of Fig. 2. Fig. 4 is a detail of a flanged wing nut.

The numerals 1 and 2 represent the members of a common form of vehicle spring, between the ends or loops 3 and 4 of which we insert our device; which is supported by loop bolts 5 and 6 hung in bushings 7 and 8 respectively.

The bushings 7 pass through the lugs 9 which are provided with suitable holes and with other apertures 10 for the purpose hereinafter set forth.

The lugs 9 terminate in a cover 11, having a cylindrical seat 12 to fit tightly over a shell 13; the opposite end of this shell fits closely in a cap 14, which is hung on a bolt 15, the threaded end 16 of which terminates in the body 17 of a flanged wing nut. It is obvious that the housing thus formed by the cover 11, the shell 13, the cap 14 and bolt 15 make a receptacle which is very simple in construction and oil or grease tight.

The flanged wing nut is shown in perspective in Fig. 4 of which 18 are the wings and 19 the flange; said flange 19 forms a seat, while the body 17 of the nut serves to center a compression spring 20 which will hereinafter be referred to as the secondary spring, because of its relative strength when compared to a heavier compression spring hereinafter described. The opposite end of the secondary spring 20 rests against the bottom 21, of a cup 22, having an opening 23 in the bottom to admit of the free passage for the bolt 15. The periphery of the cup 22 is flanged outwardly to form a seat 24 for one end of the primary compression spring 25; the other end of which rests on the saddle 26, whose straps 27 are preferably of a curved shape as shown in Fig. 3 to hug closely to the primary spring on the inside and the outer shell 13, on the outside, and extend upwardly passing through the apertures 10 of lugs 9 on the cover 11 designed for this purpose. The straps 27 are slotted at 28 to allow for the free clearance of the bushings 7. It is now evident that the wings 18 extending outwardly contacting the side of strap 27 provide a suitable means for keeping the nut from turning while proper tension is being applied to the springs 20 and 25, by means of turning the bolt 15. The outer ends of the straps 27 are perforated to receive reinforcing bushings 8 and the loop bolt 6, which passes through the loop 4, of the member 2, of the vehicle spring.

When in use on a vehicle, between the ends of each pair of springs as 1 and 2, a shock to the running gear will tend to separate or widen the distance between the loop bolts 5 and 6. The force thus exerted will be communicated from the member 1 of the vehicle spring to loop bolt 5 through the cover 11, shell 27, cap 14, bolt 15 and flanged wing nut 17, to the secondary compression spring 20, which will in many instances take up the shock, however, in extreme cases or heavily loaded vehicles, the secondary spring will become compressed to such an extent that its pressure on the bottom of the cup 22 will, by means of the flange 24, compress the primary compression spring 25, which is constructed to serve under the most severe conditions.

The advantages of using compression springs instead of expansion springs is well understood by mechanical experts and becomes a valuable feature of our device. Whether at rest or in action the pressure on the primary spring will be communicated through the straps 27 to the loop bolt 6, in the end of the opposing member 2 of the vehicle spring.

Having described our invention so that any one skilled in the art will readily understand the same and appreciate the scope and gist of the device, we claim:

1. In a device of the character described, a casing, a saddle within the casing having arms projecting out through the top thereof, a spring device resting on said saddle, a bolt extending up through the bottom of the casing, and a nut screw threaded upon the upper end of the bolt and engaging with said spring device, said nut having one or more laterally projecting wings adapted to engage with the arms of the saddle to limit the angular movement of the nut.

2. In a device of the character described, a casing, a saddle arranged within the casing and having arms projecting upwardly out of the top thereof, a short heavy spring resting on said saddle in the lower portion of the casing, a flanged cup nested within the aforesaid spring and supported from the top thereof by its flange, a long lighter spring seated within said cup and projecting upwardly out of the same, and a tension device arranged between the top of the lighter spring and the bottom of the casing.

3. In a device of the character described, a casing, a saddle arranged within the casing and having arms projecting upwardly out of the same, a short heavy coiled spring supported in said saddle, a cup nested within the aforesaid spring and having a flange at the mouth thereof resting upon the upper end of the spring, a lighter spring seated within said cup and projecting upwardly beyond the top of the same, a bolt passing freely down through said springs and through the bottom of the casing, a nut on the upper end of the bolt having a portion extending downwardly into and centering the lighter spring, and wings on said nut extending laterally in proximity to the casing to center the nut in the casing.

ALBERT S. KUX.
EUGENE H. BEACHAM.

Witnesses:
 WM. R. SHIPMAN,
 H. S. BACKUS.